US012581018B2

(12) United States Patent      (10) Patent No.:    US 12,581,018 B2

Murakami          (45) Date of Patent:     Mar. 17, 2026

(54) INFORMATION PROCESSING SYSTEM, METHOD, AND NON-TRANSITORY COMPUTER READABLE MEDIUM

(71) Applicant: FUJIFILM BUSINESS INNOVATION CORP., Tokyo (JP)

(72) Inventor: Takashi Murakami, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 408 days.

(21) Appl. No.: 18/177,947

(22) Filed: Mar. 3, 2023

(65) Prior Publication Data

US 2024/0106938 A1     Mar. 28, 2024

(30) Foreign Application Priority Data

Sep. 27, 2022    (JP) ................................. 2022-153713

(51) Int. Cl.
*H04N 1/00*        (2006.01)

(52) U.S. Cl.
CPC ..... *H04N 1/00087* (2013.01); *H04N 1/00013* (2013.01); *H04N 1/00039* (2013.01); *H04N 1/00068* (2013.01); *H04N 1/00076* (2013.01); *H04N 1/00244* (2013.01); *H04N 1/00344* (2013.01)

(58) Field of Classification Search
None
See application file for complete search history.

(56) References Cited

U.S. PATENT DOCUMENTS

| | | | |
|---|---|---|---|
| 11,252,290 B2 | 2/2022 | Soga | |
| 11,431,860 B2 | 8/2022 | Ito | |
| 2012/0150745 A1* | 6/2012 | Csulits | G06V 30/127 |
| | | | 705/45 |
| 2018/0183949 A1* | 6/2018 | Shinohara | H04N 1/00408 |
| 2020/0099797 A1* | 3/2020 | Ishii | H04N 1/00225 |
| 2020/0382654 A1* | 12/2020 | Soga | H04N 1/393 |
| 2020/0382661 A1* | 12/2020 | Ito | H04N 1/38 |
| 2021/0227086 A1* | 7/2021 | Inomata | G06V 30/2455 |
| 2021/0303841 A1* | 9/2021 | Yoneda | G06V 30/1444 |
| 2022/0159130 A1* | 5/2022 | Ishikawa | G06V 10/225 |

FOREIGN PATENT DOCUMENTS

| | | |
|---|---|---|
| JP | 2010-166267 A | 7/2010 |
| JP | 2020-198546 A | 12/2020 |
| JP | 2020-198547 A | 12/2020 |
| JP | 2020-198555 A | 12/2020 |

* cited by examiner

*Primary Examiner* — Andrew H Lam
(74) *Attorney, Agent, or Firm* — Oliff PLC

(57) ABSTRACT

An information processing system includes one or more processors configured to: acquire a history of combinations of process conditions for a first process of reading a document and a process result of a second process for an electronic document generated through the first process; calculate a degree of success in the second process for each of the process conditions on the basis of the acquired history of combinations; and present, to a user, information for assisting the first process, the information including at least the degree of success for each of the process conditions.

13 Claims, 13 Drawing Sheets

Figure 9:
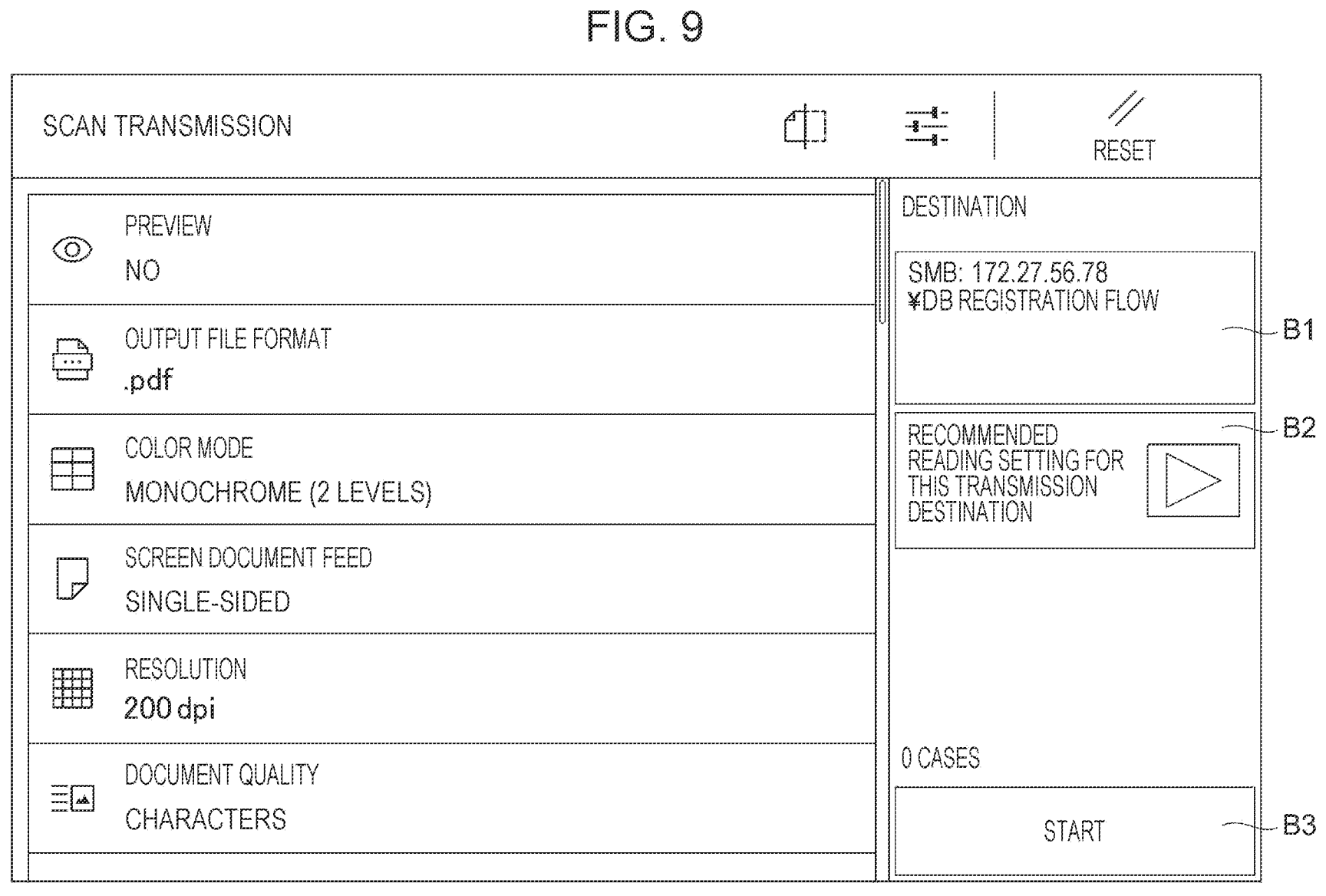

SCAN TRANSMISSION

RESET

DESTINATION

SMB: 172.27.56.78
¥DB REGISTRATION FLOW — B1

RECOMMENDED
READING SETTING FOR
THIS TRANSMISSION
DESTINATION — B2

0 CASES

START — B3

PREVIEW
NO

OUTPUT FILE FORMAT
.pdf

COLOR MODE
MONOCHROME (2 LEVELS)

SCREEN DOCUMENT FEED
SINGLE-SIDED

RESOLUTION
200 dpi

DOCUMENT QUALITY
CHARACTERS

FIG. 11

TRANSFER DESTINATION: 172.27.56.78

| No. | SETTING VALUE | NUMBER OF PROCESSES (WITH SUCCESSFUL TRANSFER) | NUMBER OF SUCCESSES | RATE OF SUCCESS |
|---|---|---|---|---|
| 1 | COLOR MODE: FULL COLOR<br>RESOLUTION: 300 dpi<br>DOCUMENT QUALITY: CHARACTERS<br>GROUND COLOR REMOVAL: YES<br>DENSITY: NORMAL | 35 | 34 | 97% |
| 2 | COLOR MODE: FULL COLOR<br>RESOLUTION: 200 dpi<br>DOCUMENT QUALITY: CHARACTERS<br>GROUND COLOR REMOVAL: YES<br>DENSITY: NORMAL | 11 | 10 | 91% |
| 3 | COLOR MODE: MONOCHROME<br>RESOLUTION: 300 dpi<br>DOCUMENT QUALITY: CHARACTERS<br>GROUND COLOR REMOVAL: YES<br>DENSITY: NORMAL | 18 | 15 | 85% |
| 4 | COLOR MODE: MONOCHROME<br>RESOLUTION: 200 dpi<br>DOCUMENT QUALITY: CHARACTERS<br>GROUND COLOR REMOVAL: YES<br>DENSITY: NORMAL | 10 | 7 | 70% |
| 5 | COLOR MODE: MONOCHROME<br>RESOLUTION: 300 dpi<br>DOCUMENT QUALITY: CHARACTERS<br>GROUND COLOR REMOVAL: NO<br>DENSITY: NORMAL | 5 | 3 | 60% |

INFORMATION PROCESSING SYSTEM, METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-153713 filed Sep. 27, 2022.

BACKGROUND

(i) Technical Field

The present disclosure relates to an information processing system, a method, and a non-transitory computer readable medium.

(ii) Related Art

There is known a technique of presenting information obtained by analyzing an electronic document generated through a process of reading a document to a user, as a technique of preventing process retrogression which may be caused in the case where a process of reading a document and a process for an electronic document generated through the reading process are performed continuously (e.g. Japanese Unexamined Patent Application Publication No. 2020-198547 and Japanese Unexamined Patent Application Publication No. 2020-198555).

SUMMARY

Such a technique may not secure efficiency or versatility, since analysis is performed each time an electronic document is generated and the format of a document to be analyzed is limited.

Aspects of non-limiting embodiments of the present disclosure relate to securing the efficiency and the versatility of a technique of preventing process retrogression which may be caused in the case where a process of reading a document and a process for an electronic document generated through the reading process are performed continuously.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including one or more processors configured to: acquire a history of combinations of process conditions for a first process of reading a document and a process result of a second process for an electronic document generated through the first process; calculate a degree of success in the second process for each of the process conditions on a basis of the acquired history of combinations; and present, to a user, information for assisting the first process, the information including at least the degree of success for each of the process conditions.

BRIEF DESCRIPTION OF THE DRAWINGS

Exemplary embodiments of the present disclosure will be described in detail based on the following figures, wherein:

FIG. 9 illustrates a specific example of a user interface to be displayed on a display section of the image reading device when a user inputs setting instruction information;

FIG. 11 illustrates a specific example of the rate of success, on the basis of which a recommended value of a process condition is calculated;

DETAILED DESCRIPTION

An exemplary embodiment of the present disclosure will be described below with reference to the accompanying drawings.

(Configuration of Information Processing System)

Figure 1:
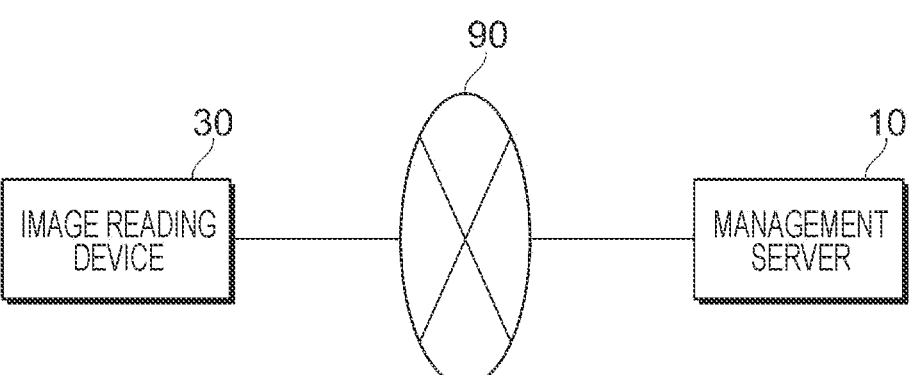
FIG. 1 illustrates an example of the overall configuration of an information processing system according to the present exemplary embodiment.

FIG. 1 illustrates an example of the overall configuration of an information processing system 1 according to the present exemplary embodiment.

The information processing system 1 is constituted by connecting a management server 10 and an image reading device 30 via a network 90. Examples of the network 90 include a Local Area Network (LAN), the Internet, etc.

The management server 10 is an information processing device that serves as a server that manages the entire information processing system 1. The management server 10 acquires information (hereinafter referred to as "process history information") about a process history, which is composed of combinations of process conditions for a process (hereinafter referred to as a "first process") of reading a document of a paper medium and a process result of a process (hereinafter referred to as a "second process") for an electronic document generated through the first process. Examples of the "second process" include a process of distributing electronic documents to databases as saving destinations, a process of storing the electronic documents in the databases, a process of notifying a user that the electronic documents have been stored in the databased (such as a process of transmitting a mail, for example), etc.

Next, the management server 10 calculates the degree of success of the second process for each of the process conditions for the first process on the basis of the acquired process history information. In the present exemplary embodiment, a "rate of success" is calculated as the degree of success of the second process. The rate of success refers to the proportion of the number of times in which the process has succeeded to the number of times of the second process. Next, the management server 10 generates information (hereinafter referred to as "setting assist information") for assisting setting of a process condition for the first process, and transmits the setting assist information toward the image reading device 30. The setting assist information includes the rate of success for each of the process conditions.

An electronic document is generated when the user who operates the image reading device 30 causes the image reading device 30 to perform the first process with reference to the setting assist information transmitted from the management server 10. When the electronic document is transmitted, the management server 10 acquires the electronic document, and performs control for the second process. The second process may be performed by the management server 10 by itself, or may be performed by a cloud service that performs a process determined in advance under control of the management server 10. The configuration of and the process by the management server 10 will be discussed in detail later.

The image reading device 30 is an information processing device that reads an image such as characters and figures formed on a recording medium such as paper and that generates an electronic document on the basis of the image data. Examples of the image reading device 30 include a scanner device, a multi-function device, etc. When the setting assist information is transmitted from the management server 10, the image reading device 30 displays the setting assist information on the user interface. After that, when the user performs an input operation for setting a process condition for the first process while referencing the setting assist information, the image reading device 30 performs the first process in accordance with the input process condition. Consequently, an electronic document is generated. The image reading device 30 transmits the generated electronic document toward the management server 10.

The configuration of the information processing system 1 discussed above is exemplary, and it is only necessary that the information processing system 1 as a whole should include the functions of achieving the processes discussed above. To that end, some or all of the functions of achieving the processes discussed above may be implemented in a shared manner or through collaboration in the information processing system 1. That is, some or all of the functions of the management server 10 may be implemented as the functions of the image reading device 30, or some or all of the functions of the image reading device 30 may be implemented as the functions of the management server 10. Further, some or all of the functions of the management server 10 and the image reading device 30 which constitute the information processing system 1 may be transferred to a different server etc. (not illustrated). Consequently, it is possible to promote the process by the information processing system 1 as a whole, and to complement the process.
(Hardware Configuration of Management Server)

Figure 2:
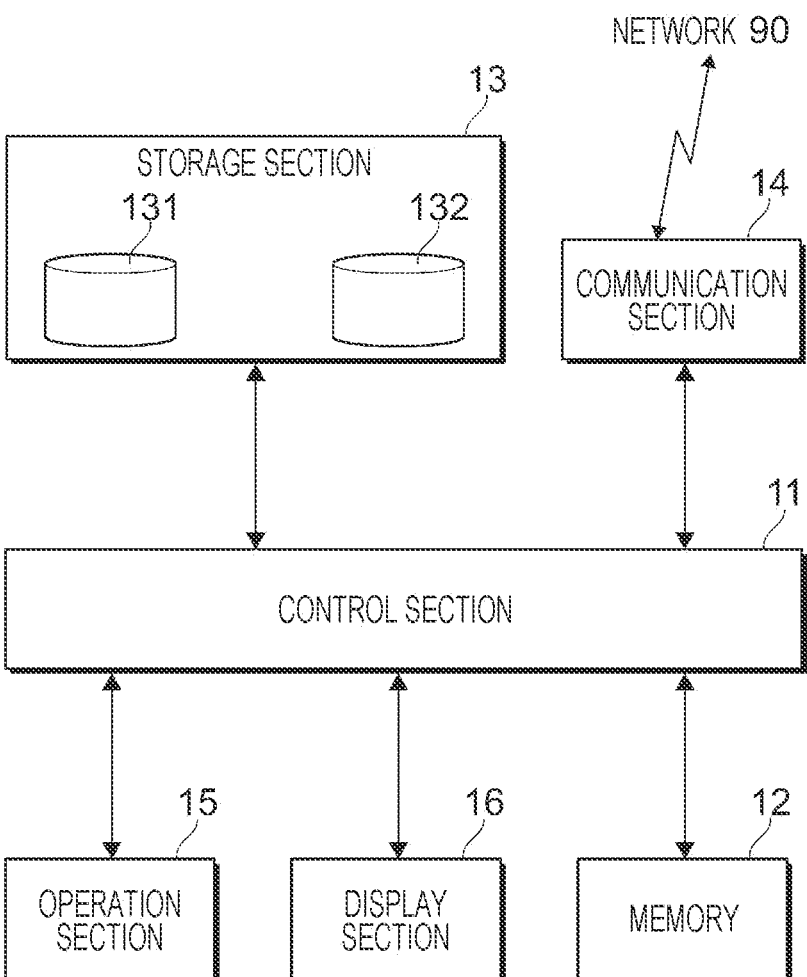
FIG. 2 illustrates an example of the hardware configuration of a management server that serves as an information processing device according to the present exemplary embodiment.

FIG. 2 illustrates an example of the hardware configuration of the management server 10 that serves as an information processing device according to the present exemplary embodiment.

The management server 10 includes a control section 11, a memory 12, a storage section 13, a communication section 14, an operation section 15, and a display section 16. These sections are connected to each other through a data bus, an address bus, a Periphral Component Interconnect (PCI) bus, etc.

The control section 11 is a processor that performs control for the function of the management server 10 through execution of various types of software such as operating software (OS) and application software. The control section 11 is constituted of a central processing unit (CPU), for example. The memory 12 is a storage region that stores the various types of software, data to be used to execute such software, etc., and is used as a work area for computation. The memory 12 is constituted of a random access memory (RAM) etc., for example.

The storage section 13 is a storage region that stores input data for the various types of software, output data from the various types of software, etc. The storage section 13 is constituted of a hard disk drive (HDD), a solid state drive (SSD), a semiconductor memory, etc. that are used to store a program, various setting data, etc., for example. The storage section 13 stores, as databases that store various types of information, a history database (DB) 131 that stores process history information, an assist DB 132 that stores setting assist information, etc., for example.

The communication section 14 transmits and receives data to and from the image reading device 30 and the outside via the network 90. The operation section 15 is constituted of a keyboard, a mouse, and mechanical buttons and switches, for example, and receives an input operation. The operation section 15 also includes a touch sensor that constitutes a touch screen together with the display section 16. The display section 16 is constituted of a liquid crystal display or an organic electro-luminescence (EL) display that is used to display information, for example, and displays data such as an image and a text.
(Hardware Configuration of Image Reading Device)

Figure 3:
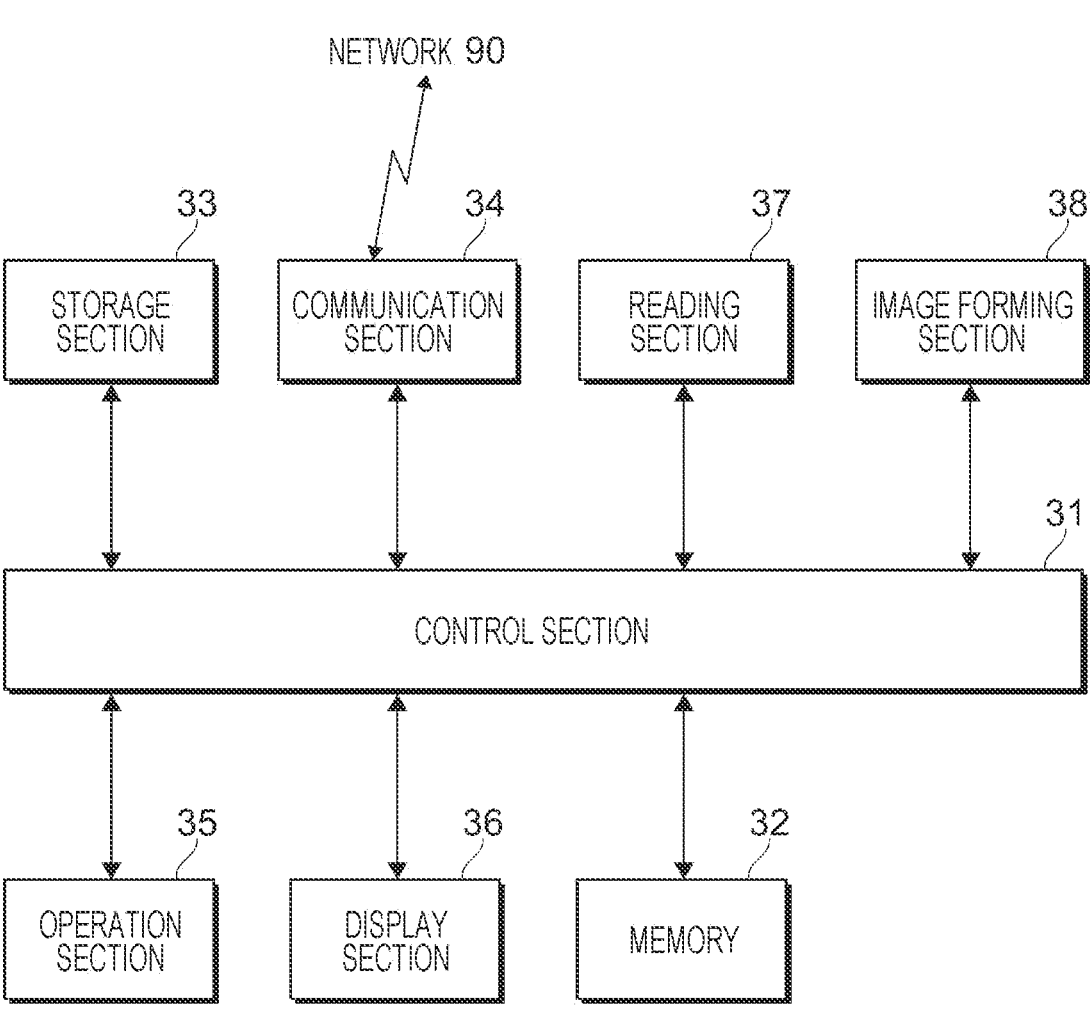
FIG. 3 illustrates an example of the hardware configuration of an image reading device that serves as an information processing device according to the present exemplary embodiment.

FIG. 3 illustrates an example of the hardware configuration of the image reading device 30 that serves as an information processing device according to the present exemplary embodiment.

The image reading device 30 includes hardware components corresponding to the control section 11, the memory 12, the storage section 13, the communication section 14, the operation section 15, and the display section 16, among the hardware components of the management server 10 in FIG. 2.

That is, the image reading device 30 includes a control section 31 constituted of a processor such as a CPU, a memory 32 constituted of a storage region such as a RAM, and a storage section 33 constituted of a storage region such as an HDD, an SSD, or a semiconductor memory. The image reading device 30 also includes a communication section 34 that transmits and receives data to and from the management server 10 and the outside via the network 90. The image reading device 30 also includes an operation section 35 constituted of a keyboard, a mouse, a touch screen, etc., and a display section 36 constituted of a liquid crystal display, an organic EL display, etc.

The image reading device 30 further includes a reading section 37 and an image forming section 38, in addition to such components. The reading section 37 reads an image recorded on a medium (such as a document on a paper medium, for example) such as paper as a recording medium. The reading section 37 is constituted of a scanner of a Charge Coupled Devices (CCD) type in which reflected light of light emitted from a light source to a document is reduced by a lens and received by CCDs, a scanner of a Contact Image Sensor (CIS) type in which reflected light of light sequentially emitted from a light emitting diode (LED) light source to a document is received by a CIS, etc., for example. The image forming section 38 forms an image based on image data on a printing surface of paper as a recording medium through electrophotography, an inkjet system, etc., for example. These sections are connected to each other through a data bus, an address bus, a PCI bus, etc. (Functional Configuration of Control Section of Management Server)

Figure 4:
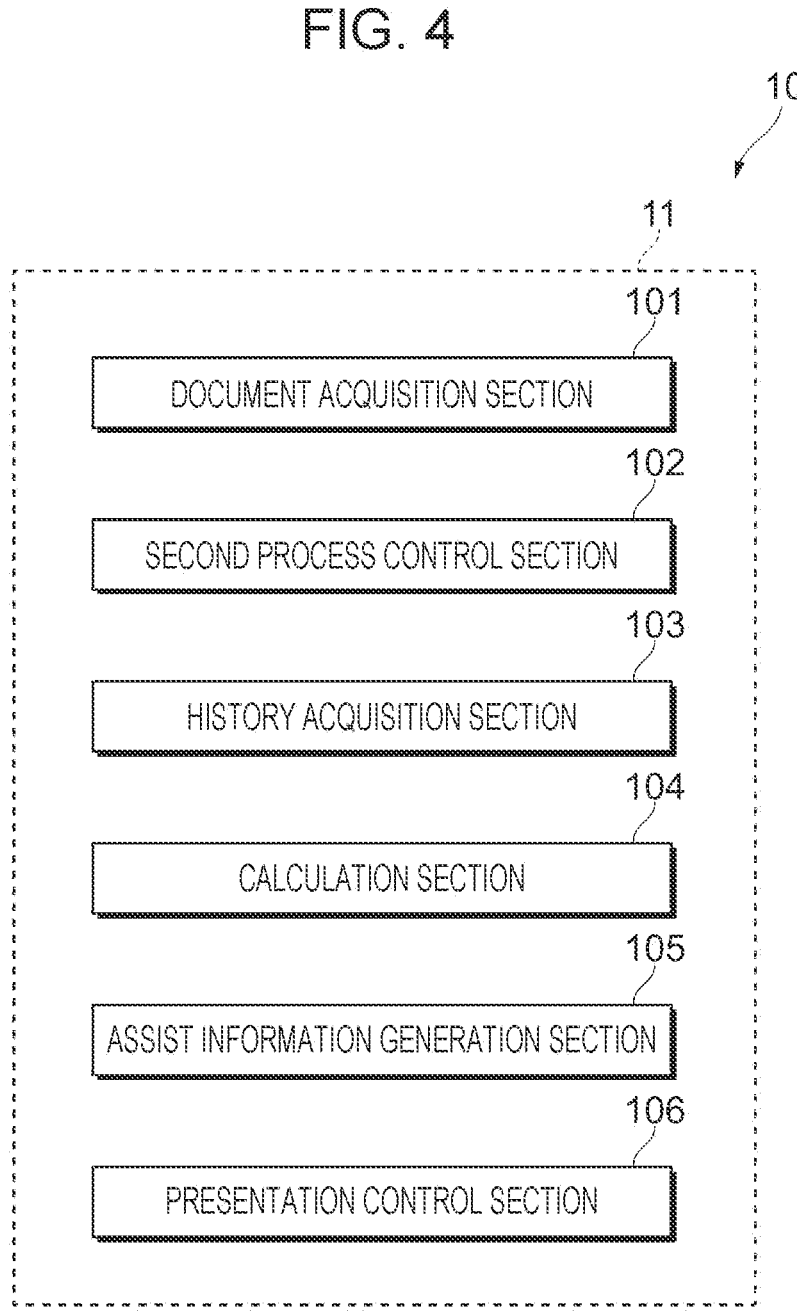
FIG. 4 illustrates an example of the functional configuration of a control section of the management server.

FIG. 4 illustrates an example of the functional configuration of the control section 11 of the management server 10.

The control section 11 of the management server 10 functions as a document acquisition section 101, a second process control section 102, a history acquisition section 103, a calculation section 104, an assist information generation section 105, and a presentation control section 106.

The document acquisition section 101 acquires an electronic document transmitted from the image reading device 30.

The second process control section 102 performs control for a second process for the electronic document transmitted from the image reading device 30.

The history acquisition section 103 acquires process history information which is the process result of the second process controlled by the second process control section 102. The process history information acquired by the history acquisition section 103 is stored in the history DB 131 (see FIG. 2) of the storage section 13 (see FIG. 2) to be managed.

The calculation section 104 calculates the rate of success of the second process for each first process condition on the basis of the process history information acquired by the history acquisition section 103. A specific example of the rate of success of the second process calculated by the calculation section 104 will be discussed later with reference to FIGS. 10 and 11.

The assist information generation section 105 generates setting assist information. Specifically, the assist information generation section 105 generates, as the setting assist information, information including the rate of success of the second process calculated by the calculation section 104. The assist information generation section 105 also generates, as the setting assist information, information including the result of analyzing an electronic document. A method that is used to analyze an electronic document is not specifically limited. Methods such as separation between text data and image data, character recognition, and key-value extraction may be used. The setting assist information generated by the assist information generation section 105 is stored in the assist DB 132 of the storage section 13 to be managed.

The presentation control section 106 performs control so as to present the setting assist information to the user. Specifically, the presentation control section 106 performs control so as to transmit the setting assist information generated by the assist information generation section 105 toward the image reading device 30 via the communication section 14. For example, the presentation control section 106 performs control so as to transmit, as the setting assist information, information in which process conditions for the first process are rearranged in the order of magnitude of the rate of success toward the image reading device 30. A specific example of the information in which process conditions for the first process are rearranged in the order of magnitude of the rate of success will be discussed later with reference to FIG. 11.

The presentation control section 106 performs control so as to transmit, as the setting assist information, information about a process condition for the first process recommended from the result of rearranging the process conditions for the first process in the order of magnitude of the rate of success toward the image reading device 30. A specific example of the information about a process condition for the first process recommended from the result of rearranging the process conditions for the first process in the order of magnitude of the rate of success will be discussed later with reference to FIG. 10. The presentation control section 106 performs control so as to present, to the user, information indicating that a process condition for the first process that is not recommended from the result of rearranging the process conditions for the first process in the order of magnitude of the rate of success has been set as the setting assist information.

The presentation control section 106 performs control so as to present, to the user, information about the result of analyzing an electronic document as the setting assist information. The analysis result includes the result of recognizing an element that affects a success in the second process etc., among elements included in each of one or more pages that constitute an electronic document, for example. In this case, the presentation control section 106 performs control so as to present, to the user, a process condition for each element recommended in the case where the first process is performed again by the image reading device 30 on the basis of the result of recognizing an element that affects a success in the second process as the setting assist information. A specific example of the "process condition for each element recommended" to be presented to the user will be discussed later with reference to FIG. 13.

The presentation control section 106 performs control so as to present, to the user, a history of previous errors caused in the second process. For example, the presentation control section 106 performs control so as to present, to the user, information in which the types of errors are rearranged in the order of magnitude of the frequency of error occurrence as the history of previous errors caused in the second process. A specific example of the information in which the types of errors are rearranged in the order of magnitude of the frequency of error occurrence will be discussed later with reference to FIG. 11.

(Functional Configuration of Control Section of Image Reading Device)

Figure 5:
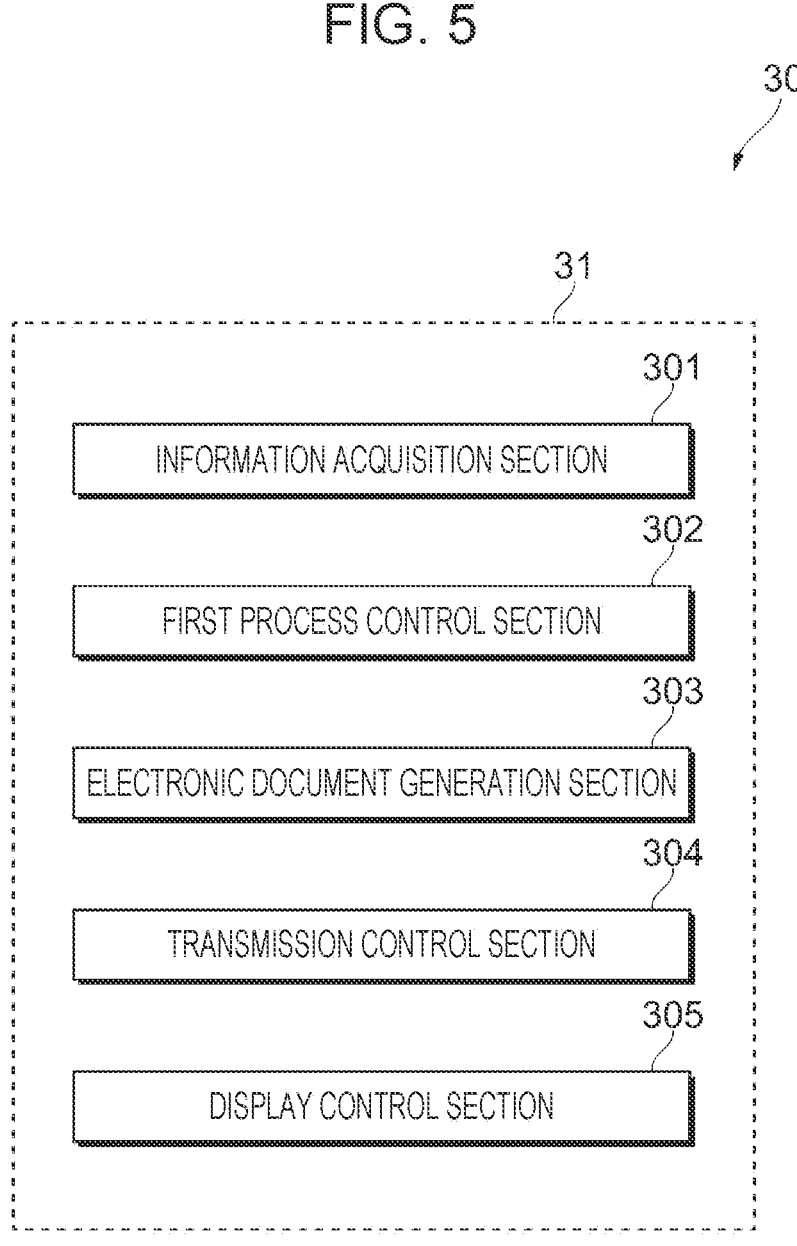
FIG. 5 illustrates an example of the functional configuration of a control section of the image reading device.

FIG. 5 illustrates an example of the functional configuration of the control section 31 of the image reading device 30.

The control section 31 of the image reading device 30 functions as an information acquisition section 301, a first process control section 302, an electronic document generation section 303, a transmission control section 304, and a display control section 305.

The information acquisition section 301 acquires various types of information transmitted from the management server 10 or the outside. Specifically, the information acquisition section 301 acquires the setting assist information transmitted from the management server 10 via the communication section 34 (see FIG. 3), for example. The information acquisition section 301 also acquires information input through the operation section 35 (see FIG. 3). Examples of the information input through the operation section 35 include information input in order to designate the management server 10 which performs control for the second process, information (hereinafter referred to as "setting instruction information") input in order to indicate setting of a process condition for the first process, etc.

The first process control section 302 performs control for the first process. Specifically, the first process control section 302 performs control so as to cause the reading section 37 (see FIG. 3) to read a document on a paper medium in accordance with a process condition specified from the setting instruction information input by the user.

The electronic document generation section 303 generates an electronic document obtained by digitalizing the document read by the reading section 37.

The transmission control section 304 performs control so as to transmit various types of information toward the management server 10 or the outside. Specifically, the transmission control section 304 performs control so as to transmit the electronic document generated by the electronic document generation section 303 toward the management server 10 via the communication section 34, for example.

The display control section 305 performs control so as to display various types of information on the display section 36 (see FIG. 3). Specifically, the display control section 305 performs control so as to display a user interface on the display section 36, for example. The user interface displays various types of information such as the setting assist information acquired by the information acquisition section 301 and a preview of the electronic document generated by the electronic document generation section 303, for example. Specific examples of the setting assist information etc. to be displayed on the user interface will be discussed later with reference to FIGS. 10, 12, and 13.

(Flow of Process by Management Server)

Figure 6:
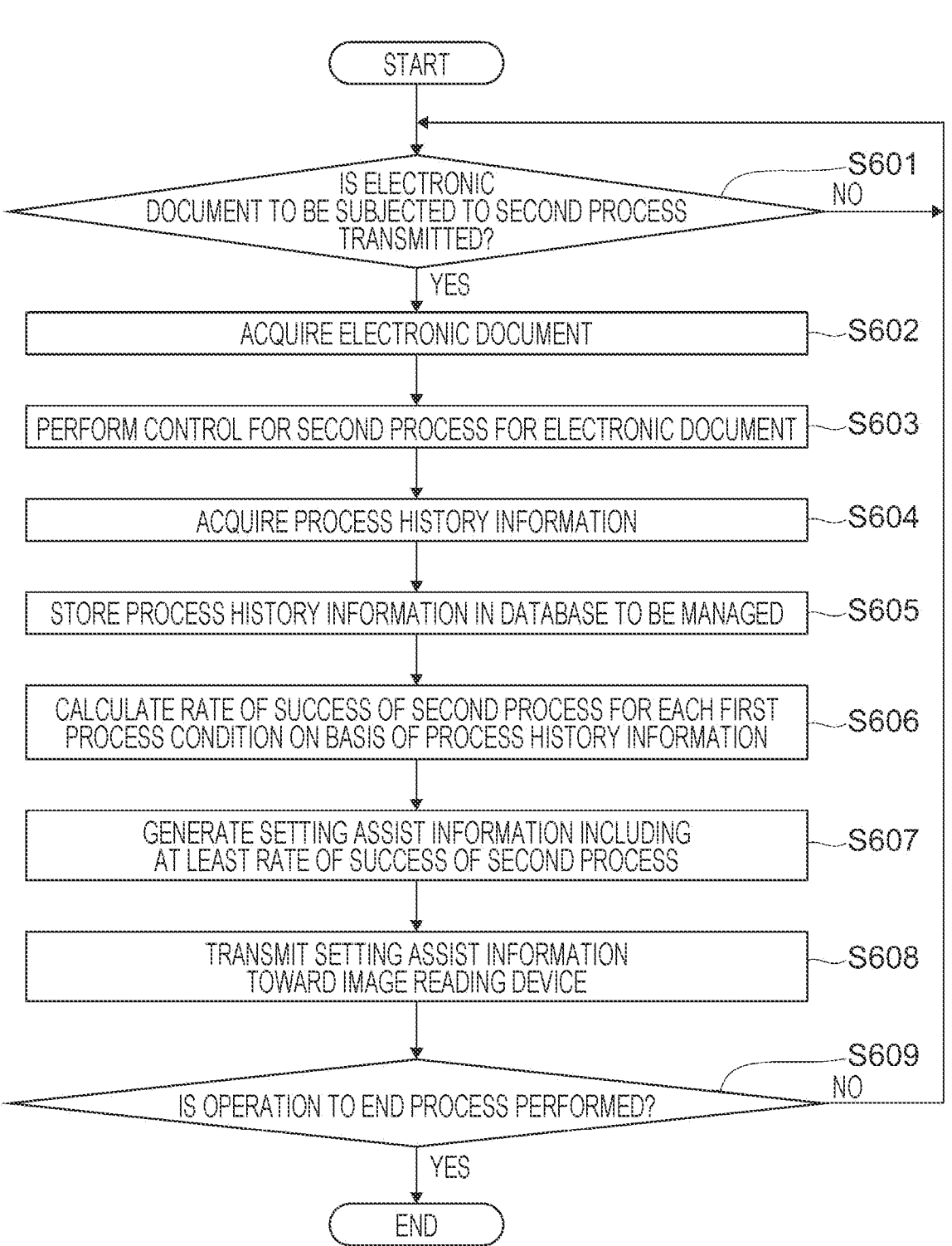
FIG. 6 is a flowchart illustrating an example of the flow of a process by the management server.

FIG. 6 is a flowchart illustrating an example of the flow of a process by the management server 10.

When an electronic document to be subjected to the second process and generated as a result of the first process by the image reading device 30 is transmitted (YES in step 601), the management server 10 acquires the electronic document (step 602). In the case where an electronic document is not transmitted from the image reading device 30 (NO in step 601), on the contrary, the management server 10 repeatedly performs step 601 until an electronic document is transmitted from the image reading device 30.

Next, the management server 10 performs control for the second process for the electronic document acquired in step 602 (step 603), and acquires process history information as the process result of the second process (step 604). Then, the management server 10 stores the process history information acquired in step 604 in a database to be managed (step 605). Next, the management server 10 calculates the rate of success of the second process for each first process condition on the basis of the process history information stored in the database (step 606).

Next, the management server 10 generates setting assist information including at least the rate of success of the second process as a result of the calculation in step 606 (step 607), and transmits the setting assist information toward the image reading device 30 (step 608). Then, when an operation to end the process is performed (YES in step 609), the management server 10 ends the process (END). In the case where an operation to end the process is not performed (NO in step 609), on the contrary, the management server 10 returns to step 601.

(Flow of Process by Image Reading Device)

Figure 7:
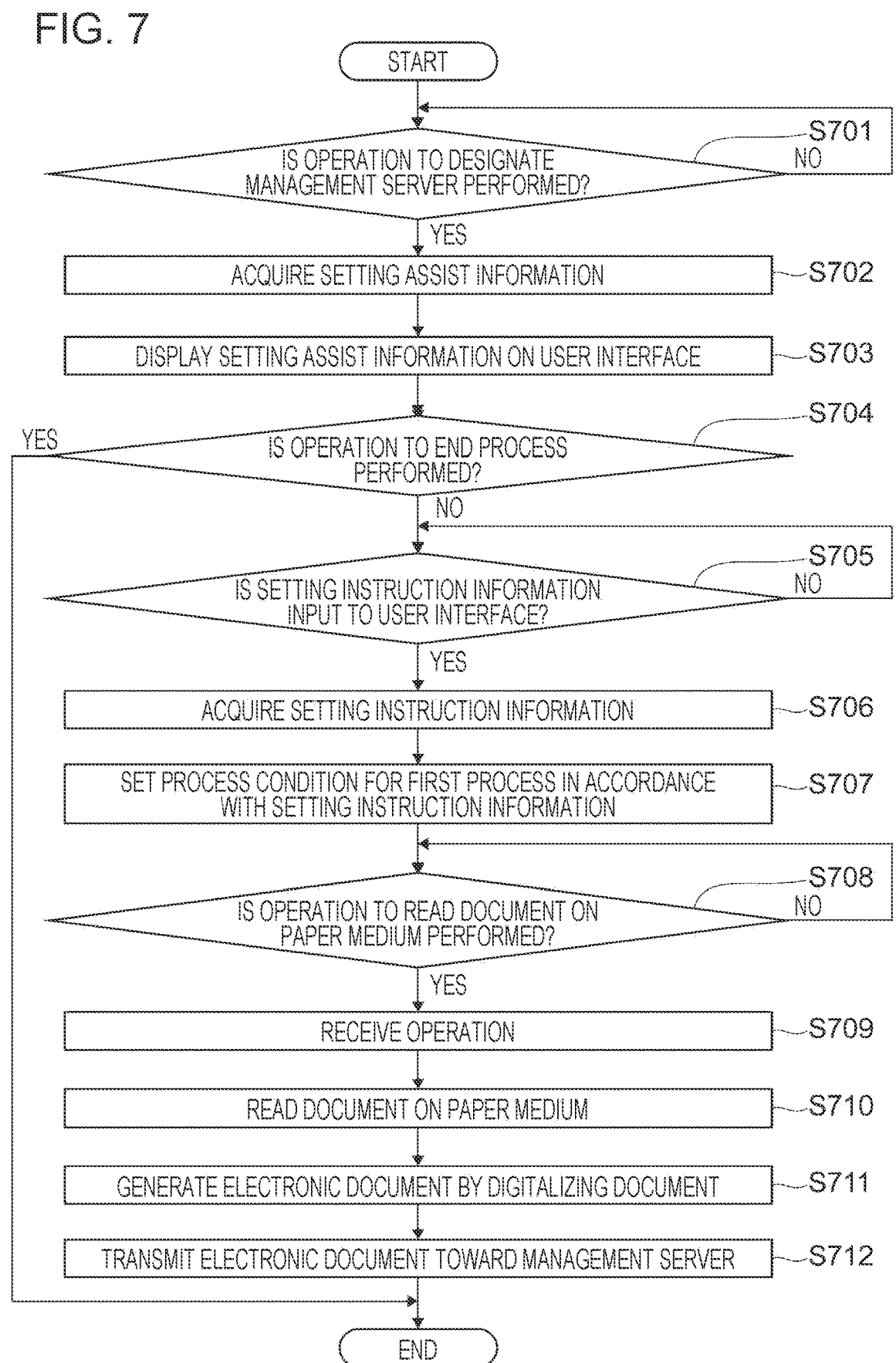
FIG. 7 is a flowchart illustrating an example of the flow of a process by the image reading device.

FIG. 7 is a flowchart illustrating an example of the flow of a process by the image reading device 30.

When an operation to designate the management server 10 which performs the second process is performed (YES in step 701), the image reading device 30 acquires setting assist information on the management server 10 (step 702), and displays the acquired setting assist information on the user interface (step 703). In the case where an operation to designate the management server 10 which performs the second process is not performed (NO in step 701), on the contrary, the image reading device 30 repeatedly performs the process in step 701.

When an operation to end the process is performed (YES in step 704), the image reading device 30 ends the process (END). In the case where an operation to end the process is not performed (NO in step 704), on the contrary, the image reading device 30 proceeds to step 705. When setting instruction information is input to the user interface (YES in step 705), the image reading device 30 acquires the input setting instruction information (step 706), and sets a process condition for the first process in accordance with the setting instruction information (step 707). In the case where setting instruction information is not input (NO in step 705), on the contrary, the image reading device 30 repeatedly performs step 705 until setting instruction information is input to the user interface.

Next, when an operation to read a document on a paper medium is performed (YES in step 708), the image reading device 30 receives the operation (step 709), and reads the document on the paper medium (step 710). Then, the image reading device 30 generates an electronic document by digitalizing the read document (step 711), and transmits the electronic document toward the management server 10 (step 712). Consequently, the process is ended (END). In the case where an operation to read a document on a paper medium is not performed (NO in step 708), on the contrary, the image reading device 30 repeatedly performs step 708 until an operation to read a document on a paper medium is performed.

Specific Example

Figure 8:
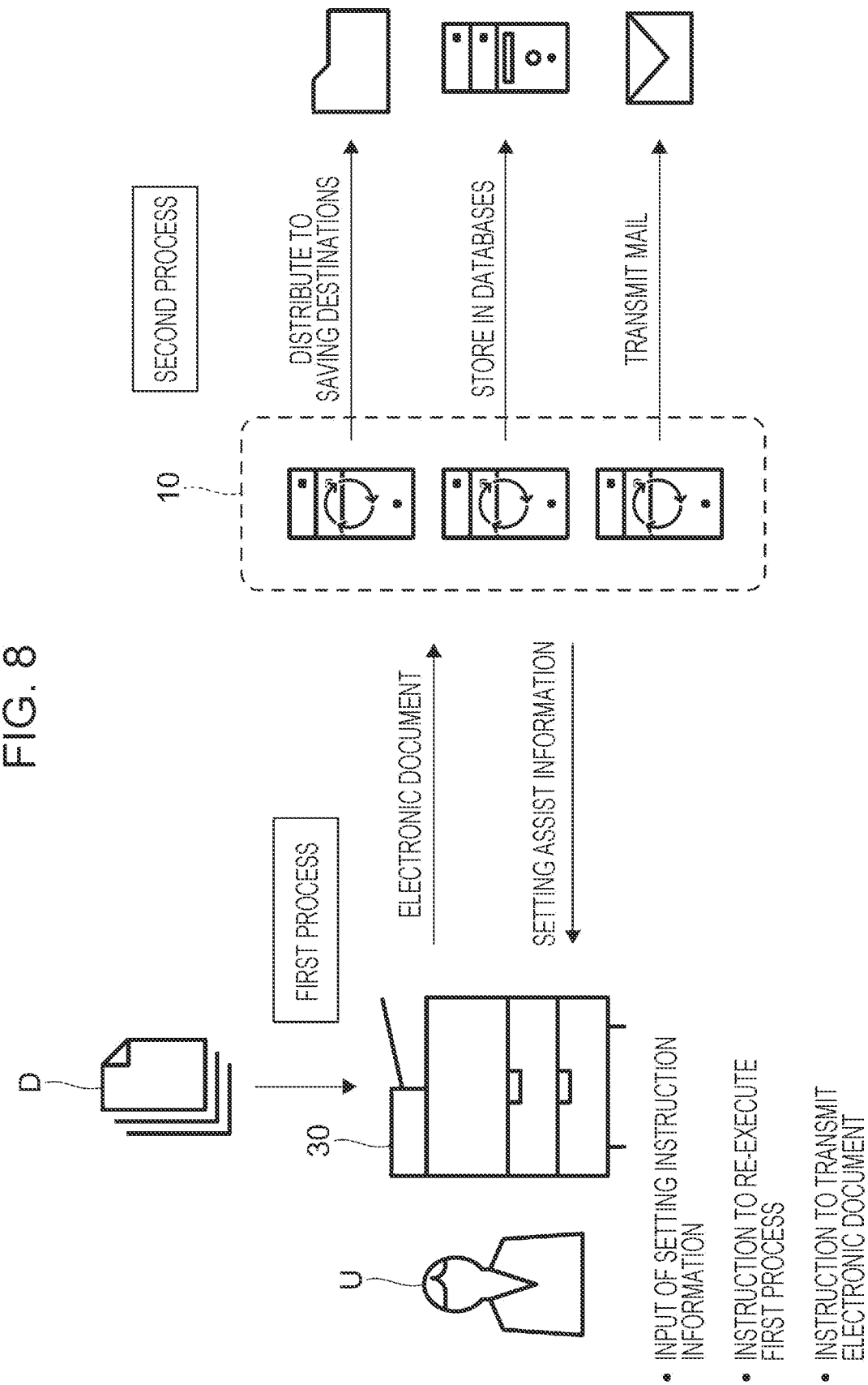
FIG. 8 is an image illustrating an overview of control for a first process by the image reading device and control for a second process by the management server.

FIG. 8 is an image illustrating an overview of control for the first process by the image reading device 30 and control for the second process by the management server 10.

First, a user U sets a recording medium D such as paper to the image reading device 30, and performs an operation to designate the management server 10 which performs the second process on the user interface displayed on the display section 36 of the image reading device 30. Then, setting assist information including the rate of success of the second process is displayed on the user interface. The user U performs an operation to input setting instruction information for the first process while referencing the setting assist information. A specific example of the user interface displayed on the display section 36 of the image reading device 30 when the user U performs an operation to input setting instruction information will be discussed later with reference to FIG. 9.

When setting of a process condition for the first process based on the setting instruction information is completed in the image reading device 30, the user U performs an input operation (e.g. an operation to depress a start button) to start reading of the recording medium D. Then, the image reading device 30 performs the first process in accordance with the set process condition. Specifically, the image reading device 30 reads an image such as characters and figures formed on the recording medium D, and generates an electronic document on the basis of the read image data. The generated electronic document is transmitted toward the management server 10.

The management server 10 acquires the electronic document transmitted from the image reading device 30, and generates setting assist information including the result of analyzing the electronic document. The setting assist information is transmitted from the management server 10 toward the image reading device 30. When the setting assist information including the result of analyzing the electronic document is acquired, the image reading device 30 displays the setting assist information on the user interface.

The user U provides an instruction to execute the first process again, as necessary, while referencing the setting assist information displayed on the user interface. Specifically, the user U performs an operation to cause the image reading device 30 to perform reading again. A specific example of the user interface to be displayed on the display section 36 of the image reading device 30 when the user U performs such an operation will be discussed later with reference to FIGS. 12 and 13.

When an electronic document is generated through completion of the first process by the image reading device 30, the electronic document is transmitted from the image reading device 30 toward the management server 10 on the basis of an operation by the user U. When the transmitted electronic document is acquired, the management server 10 performs control for the second process for the electronic document. For example, the management server 10 performs control for distributing electronic documents to saving destinations, storing the distributed electronic documents in the databases, transmitting a mail to indicate that the electronic documents have been stored, etc., as illustrated in FIG. 8.

FIG. 9 illustrates a specific example of a user interface to be displayed on the display section 36 of the image reading device 30 when the user inputs setting instruction information.

As illustrated in FIG. 9, when the user sets a process condition for the first process, various initial values for "(presence or absence of) preview", "output file format", "color mode", "screen document feed", "resolution", and "document quality" as process conditions are displayed on the user interface displayed on the display section 36 under the notation "scan transmission". Specifically, "(presence or absence of) preview" has "no", "output file format" has ".pdf", "color mode" has "monochrome (2 levels)", "screen document feed" has "single-sided", "resolution" has "200 dpi", and "document quality" has "characters" as initial values.

First, the user designates the management server 10 which performs control for the second process by depressing a button B1 disposed in the "destination" field. In the example in FIG. 9, the management server 10 specified by "172.27.56.78" is designated. Next, the user depresses a button B2 that reads "recommended reading setting for this transmission destination". When the button B2 is depressed, a recommended value of a process condition for the first process performed before the second process performed under control of the management server 10 specified by "172.27.56.78" is displayed on the user interface. A specific example of the user interface displayed when the user depresses the button B2 will be discussed later with reference to FIG. 10.

Figure 10:
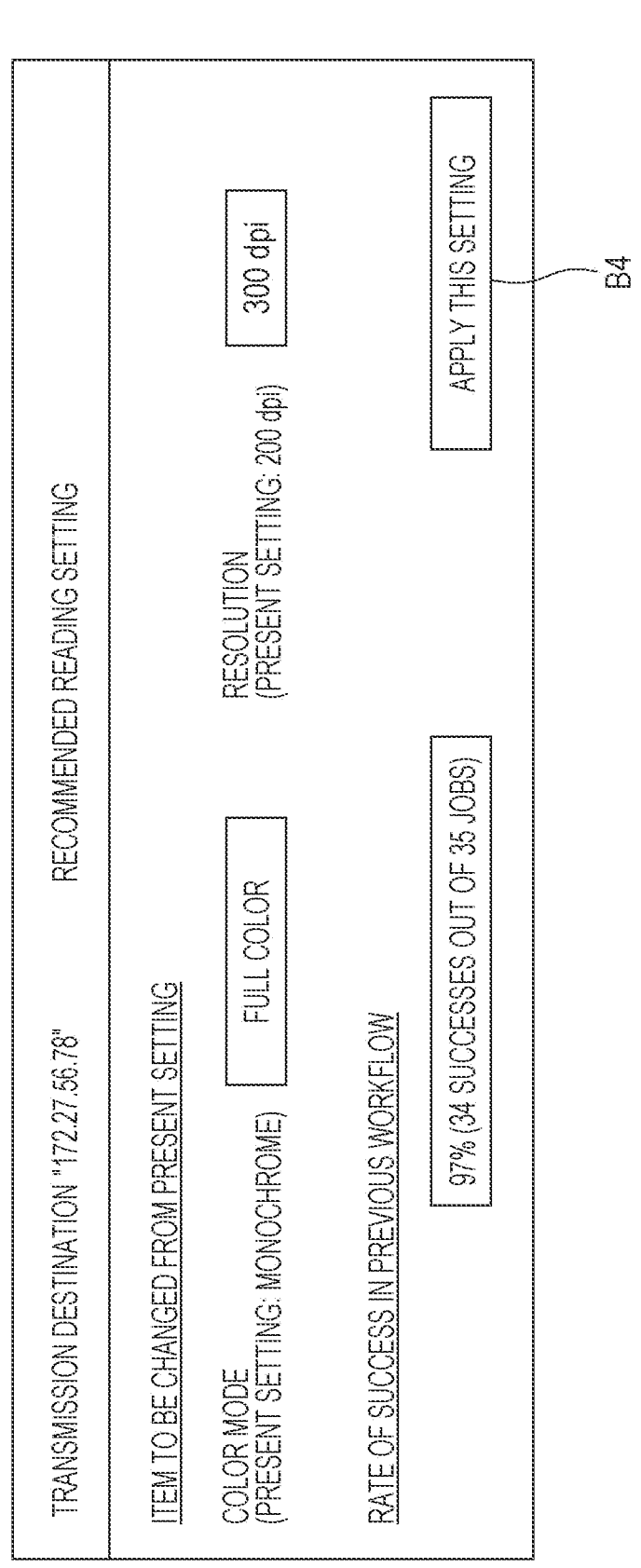
FIG. 10 illustrates a specific example of a recommended value of a process condition for the first process, of setting assist information displayed on the user interface.

FIG. 10 illustrates a specific example of a recommended value of a process condition for the first process, of setting assist information displayed on the user interface.

When the button B2 in FIG. 9 discussed above is depressed, a recommended value of a process condition for the first process is displayed as the setting assist information. Specifically, recommended values of "color mode" and "resolution" are displayed in comparison to the present set values as "items changed from present setting" as illustrated in FIG. 10, for example. In the example in FIG. 10, a recommended value of color mode is "full color", while the present setting is "monochrome". Meanwhile, a recommended value of resolution is "300 dpi", while the present setting is "200 dpi". In the example in FIG. 10, "rate of success in previous workflow" is displayed as the setting assist information. Specifically, the rate of success with the recommended values is "97% (34 successes out of 35 jobs)". That is, it is indicated that the second process succeeds at a probability of 97% in the case where the first process is executed with the process condition indicated in FIG. 10 and the second process for an electronic document generated as a result of the first process is performed under control of the management server 10 specified by "172.27.56.78".

When the user is satisfied with the application of the process condition displayed on the user interface illustrated in FIG. 10, the user depresses a button B4 that reads "apply this setting". Then, the screen in FIG. 9 discussed above is displayed again. The content of the process condition displayed in FIG. 10 is reflected in the screen illustrated in FIG. 9 (not illustrated). Then, when the user depresses a button B3 that reads "start" in FIG. 9, the image reading device 30 starts the first process.

FIG. 11 illustrates a specific example of the rate of success, on the basis of which a recommended value of a process condition is calculated.

The management server 10 calculates a "rate of success" on the basis of the "number of processes (with successful transfer)" and the "number of successes" for each combination of setting values for a process condition. Then, the management server 10 rearranges the calculated rate of success in the descending order, and determines the combination of setting values for a process condition with the highest rate of success as a recommended value of a process condition for the first process. In the example in FIG. 11, a list of combinations of setting values for process conditions "No. 1" to "No. 5" is displayed. Among these, "No. 1" is displayed in boldface type, and has a rate of success of "97%". Some or all of the setting values are displayed on the screen in FIG. 10 discussed above as a recommended value.

The list indicated in FIG. 11 may be managed on the management server 10 side only, or may be displayed on the user interface of the image reading device 30. While a list of five combinations of setting values with the highest rate of success is displayed in the example in FIG. 11, a list of combinations with the lowest rate of success may be displayed to warn the user of setting values that tend to cause an error.

Figure 12:
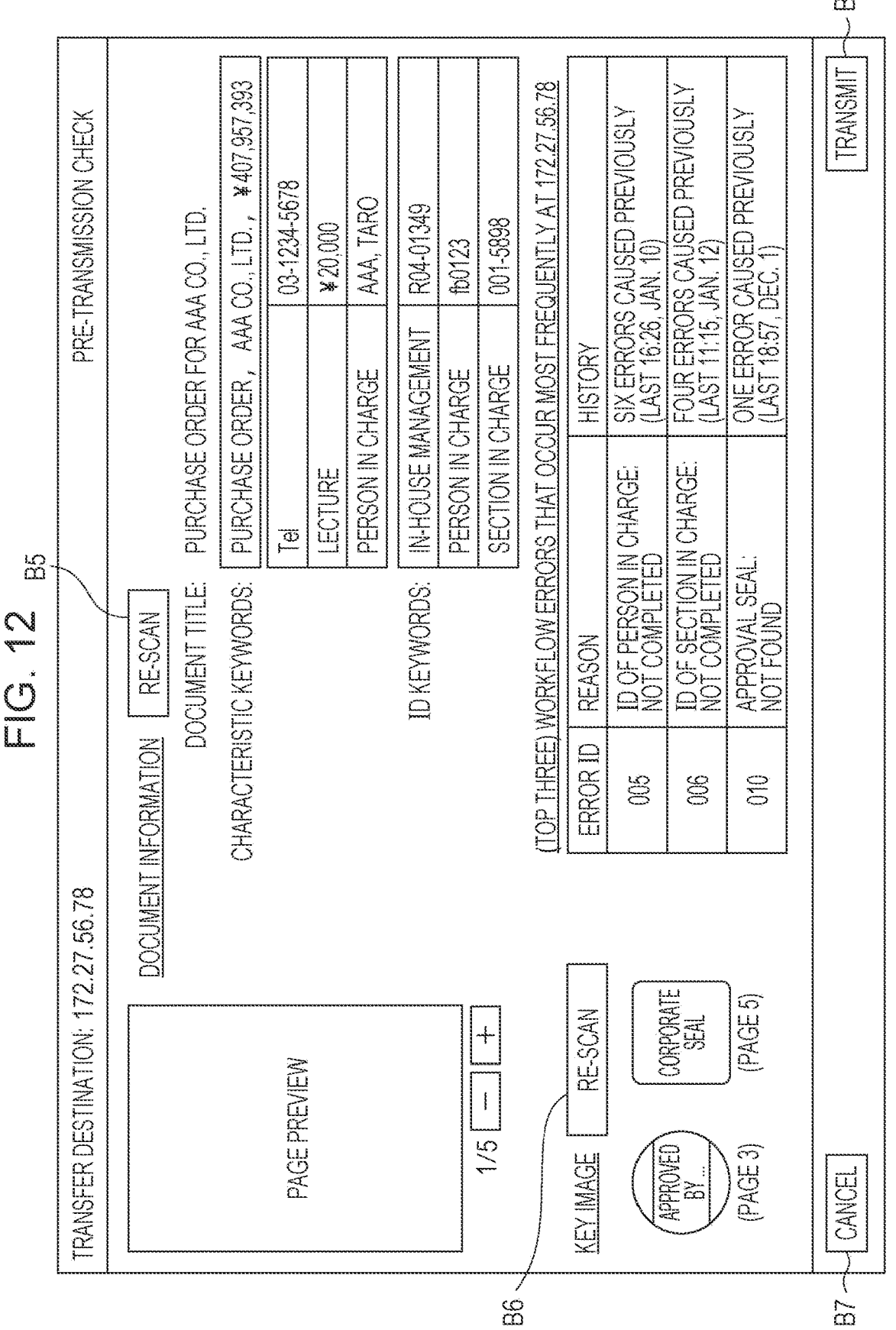
FIG. 12 illustrates a specific example of a pre-transmission preview screen, of the setting assist information displayed on the user interface.

FIG. 12 illustrates a specific example of a pre-transmission preview screen, of the setting assist information displayed on the user interface.

When the button B3 that reads "start" in FIG. 9 discussed above is depressed, the image reading device 30 starts reading to generate an electronic document. The generated electronic document is not immediately transmitted toward the management server 10, but a preview screen (hereinafter referred to as a "pre-transmission preview screen") is displayed before transmission. The pre-transmission preview screen displays the result of analyzing each page of the generated electronic document.

For example, the pre-transmission preview screen includes "page preview", "document information", "key image", and "frequently caused workflow errors" as illustrated in FIG. 12. The "page preview" is a thumbnail image of each page that constitutes the electronic document. The "document information" includes a document title, characteristic keywords, and identification (ID) keywords. The "characteristic keywords" refer to characteristic keywords that may cause an error in reading. In the example in FIG. 12, the characteristic keywords include "purchase order" which is a keyword that indicates the type of the document, "AAA Co., Ltd." which is a keyword that indicates the destination of the document, and "¥407,957,393" which is a keyword that indicates the amount. The characteristic keywords further include keywords corresponding to "Tel" which is an item for a keyword that indicates a contact, "lecture" which is an item for a keyword that indicates a content, and "person in charge" which is an item for a keyword that indicates a person in charge.

The "ID keywords" refer to keywords as identification information that may cause an error in reading. In the example in FIG. 12, the ID keywords include keywords corresponding to "in-house management" which is a keyword for in-house identification of the document, "person in charge" which is a keyword for identifying the person in charge, and "section in charge" which is a keyword for identifying the section in charge. The user checks the content displayed in "document information", and depresses a button B5 that reads "re-scan" in the case where there is any error or lack of recognition of information that may be determined as an error in the second process. Then, a user interface that receives input of information for performing the first process again is displayed. A specific example of the user interface will be discussed later with reference to FIG. 13.

The "key image" displayed on the user interface in FIG. 12 refers to a principal image that may cause an error in reading, among images included in the page. A method of extracting a key image is not specifically limited, and may be set by the user. For example, criteria such as the image size, the arrangement position on page (e.g. whether the image is printed around the four corners of the page), and whether the image includes characters may be set. In the example in FIG. 12, two images are displayed as the key image. Specifically, the key image includes an image of an approval seal printed on "page 3" of the electronic document, and an image of a corporate seal printed on "page 5". The user checks the images displayed in the "key image", and depresses a button B6 that reads "re-scan" in the case where there is any error or lack of recognition of an image that may be determined as an error in the second process.

When the user depresses the button B6, a user interface for receiving input of information for performing the first process again is displayed. For example, it is seen in the example in FIG. 12 that an image of an approval seal printed on page 3 of the electronic document is not clear. In this case, the user may depress the button B6 in order to read page 3 of the electronic document again. A specific example of the user interface for receiving input of information for performing the first process again will be discussed later with reference to FIG. 13.

The "frequently caused workflow errors" displayed on the user interface in FIG. 12 includes the top-three most frequent errors for the management server 10 which performs control for the second process. In the example in FIG. 12, an error "ID of person in charge: not completed" (error ID: "005") has occurred six times previously. An error "ID of section in charge: not completed" (error ID: "006") has occurred four times previously. An error "approval seal: not found" (error ID: "010") has occurred once previously.

The user checks what errors were caused previously while seeing the "frequently caused workflow errors" displayed on the user interface. Then, the user determines whether the image reading device 30 is caused to perform the first process again. For example, the error with an error ID "010" is an error "approval seal: not found", while the approval seal on "page 3" in "key image" discussed above is not clear. In this case, an error may be caused in the second process if the electronic document is transmitted. Therefore, the user depresses the button B6 to read page 3 of the electronic document again.

The user depresses a button B7 that reads "cancel" in the case where it is desired to cancel the process without causing the image reading device 30 to perform the first process again. On the contrary, the user depresses a button B8 that reads "transmit" in the case where it is desired to transmit the electronic document toward the management server 10 without causing the image reading device 30 to perform the first process again.

Figure 13:
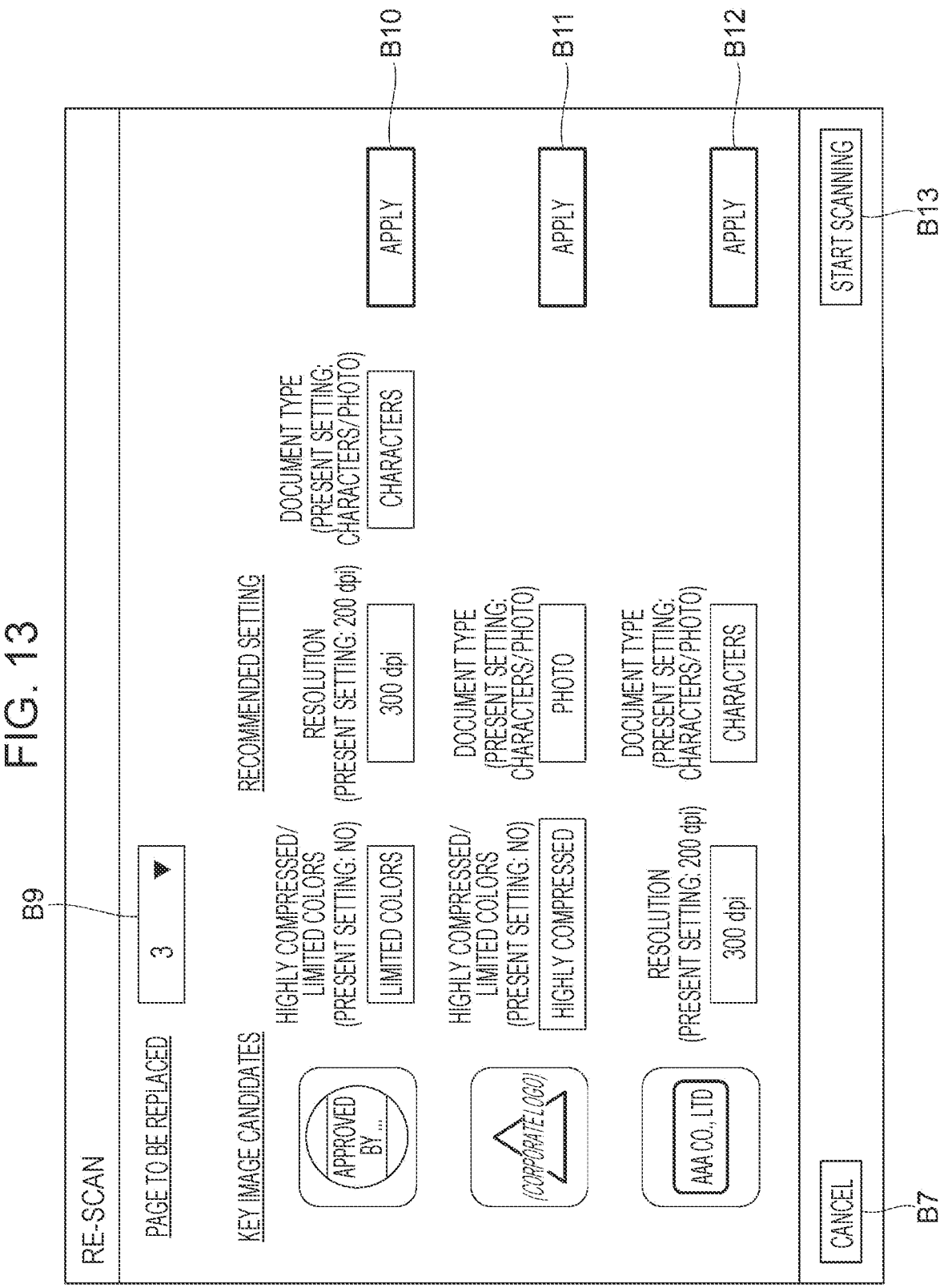
FIG. 13 illustrates a specific example of a user interface for receiving input of information for causing the image reading device to perform the first process again.

FIG. 13 illustrates a specific example of a user interface for receiving input of information for causing the image reading device 30 to perform the first process again.

When the button B6 in FIG. 12 discussed above is depressed, the user interface illustrated in FIG. 13 is displayed. This user interface includes indications "re-scan", "page to be replaced", "key image candidate", and "recommended setting". A button B9 for designating the page to be re-read is displayed on the right side of the indication "page to be replaced". In the example in FIG. 13, page "3" is designated as the target to be re-read.

A list of images that may be re-read is displayed under the indication "key image candidate". In the example in FIG. 13, three images are displayed, and thus three key images are printed on page 3 of the electronic document. Recommended values of process conditions for images that may be re-read are displayed under the indication "recommended setting". The recommended values of process conditions for images are based on criteria determined in advance, such as the number of colors in the image, whether the image includes characters, etc., for example.

The user references the recommended values of process conditions for images that may be re-read, and depresses each of buttons B10 to B12 that read "apply" as necessary. For example, in the case where the process condition for an approval seal which is not clear, among the three key images, is changed to "recommended setting", the user depresses the button B10, and depresses a button B13 that reads "start scanning". Then, the first process is performed again in accordance with the set process condition, and the user interface in FIG. 12 discussed above is displayed anew. The "recommended setting" illustrated in FIG. 13 may be adjustable by the user.

Other Exemplary Embodiments

While the present exemplary embodiment has been described above, the present disclosure is not limited to the present exemplary embodiment discussed above. The effect of the present disclosure is also not limited to that described in relation to the present exemplary embodiment discussed above. For example, the configuration of the information processing system 1 illustrated in FIG. 1, the hardware configuration of the management server 10 illustrated in FIG. 2, and the hardware configuration of the image reading device 30 illustrated in FIG. 3 are merely exemplary for achieving the object of the present disclosure, and are not specifically limiting. The functional configuration of the management server 10 illustrated in FIG. 4 and the functional configuration of the image reading device 30 illustrated in FIG. 5 are also merely exemplary, and are not specifically limiting. It is only necessary that the information processing system 1 in FIG. 1 should include the function of executing the processes discussed above as a whole, and the examples in FIGS. 4 and 5 do not limit the functional configuration for implementing the function.

For example, while the management server 10 is configured to perform a process of generating setting assist information in the exemplary embodiment discussed above, this is not limiting. For example, the image reading device 30 may perform the process of the information processing system 1 discussed above alone.

The order of process steps by the management server 10 illustrated in FIG. 6 and process steps by the image reading device 30 illustrated in FIG. 7 is also merely exemplary, and is not specifically limiting. The illustrated processes are not necessarily performed chronologically along the step order, and may be performed concurrently or individually. The specific examples illustrated in FIGS. 8 to 13 are also merely exemplary, and are not specifically limiting.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))
    An information processing system comprising:
    one or more processors configured to:
        acquire a history of combinations of process conditions for a first process of reading a document and a process result of a second process for an electronic document generated through the first process;
        calculate a degree of success in the second process for each of the process conditions on a basis of the acquired history of combinations; and
        present, to a user, information for assisting the first process and including at least the degree of success for each of the process conditions.

(((2)))
    The information processing system according to (((1))),
        wherein the one or more processors are configured to present, to the user, information in which the process conditions are rearranged in an order of magnitude of the degree of success as the information for assisting the first process.

(((3)))
    The information processing system according to (((2))),
        wherein the one or more processors are configured to present, to the user, a recommended process condition on a basis of a result of rearranging the process conditions.

(((4)))
    The information processing system according to (((2))) or (((3))),
        wherein the one or more processors are configured to inform the user that a process condition that is not recommended has been set, on a basis of a result of rearranging the process conditions.

(((5)))
    The information processing system according to any one of (((1))) to (((4))),
        wherein the one or more processors are configured to present, to the user, a result of analyzing the electronic document as the information for assisting the first process.

(((6)))
    The information processing system according to (((5))),
        wherein the one or more processors are configured to present, to the user, a result of recognizing an element that affects success in the second process, among elements included in each of one or more pages that constitute the electronic document, as the result of analyzing the electronic document.

(((7)))
    The information processing system according to (((6))),
        wherein the one or more processors are configured to present, to the user, a result of recognizing at least one of text data and image data included in each of the one or more pages as the element that affects success in the second process.

(((8)))
    The information processing system according to (((7))),
        wherein the one or more processors are configured to present, to the user, a process condition recommended in a case where the first process is performed again on a basis of the result of recognizing.

(((9)))
    The information processing system according to (((8))),
        wherein the one or more processors are configured to present, to the user, the recommended process condition for each of the elements.

(((10)))
    The information processing system according to any one of (((5))) to (((9))),
        wherein the one or more processors are configured to further present, to the user, a history of previous errors caused in the second process.

(((11)))
    The information processing system according to (((10))),
        wherein the one or more processors are configured to present, to the user, information in which types of the errors are rearranged in an order of magnitude of frequency of error occurrence as the history of previous errors caused in the second process.

(((12)))

A program causing a computer to execute a process comprising:

acquiring a history of combinations of process conditions for a first process of reading a document and a process result of a second process for an electronic document generated through the first process;

calculating a degree of success in the second process for each of the process conditions on a basis of the acquired history of combinations; and presenting, to a user, information for assisting the first process and including at least the degree of success for each of the process conditions.

What is claimed is:

1. An information processing system comprising:

one or more processors configured to:

acquire a history of combinations of process conditions for a first process of reading a document and a process result of a second process for an electronic document generated through the first process;

calculate a degree of success in the second process for each of the process conditions on a basis of the acquired history of combinations; and present, to a user, information for assisting the first process, the information including at least the degree of success for each of the process conditions.

2. The information processing system according to claim 1, wherein the one or more processors are configured to present, to the user, information in which the process conditions are rearranged in an order of magnitude of the degree of success as the information for assisting the first process.

3. The information processing system according to claim 2, wherein the one or more processors are configured to present, to the user, a recommended process condition on a basis of a result of rearranging the process conditions.

4. The information processing system according to claim 2, wherein the one or more processors are configured to inform the user that a process condition that is not recommended has been set, on a basis of a result of rearranging the process conditions.

5. The information processing system according to claim 1, wherein the one or more processors are configured to present, to the user, a result of analyzing the electronic document as the information for assisting the first process.

6. The information processing system according to claim 5, wherein the one or more processors are configured to present, to the user, a result of recognizing an element that affects success in the second process, among elements included in each of one or more pages that constitute the electronic document, as the result of analyzing the electronic document.

7. The information processing system according to claim 6, wherein the one or more processors are configured to present, to the user, a result of recognizing at least one of text data and image data included in each of the one or more pages as the element that affects success in the second process.

8. The information processing system according to claim 7, wherein the one or more processors are configured to present, to the user, a process condition recommended in a case where the first process is performed again on a basis of the result of recognizing.

9. The information processing system according to claim 8, wherein the one or more processors are configured to present, to the user, the recommended process condition for each of the elements.

10. The information processing system according to claim 9, wherein the one or more processors are configured to further present, to the user, a history of previous errors caused in the second process.

11. The information processing system according to claim 10, wherein the one or more processors are configured to present, to the user, information in which types of the errors are rearranged in an order of magnitude of frequency of error occurrence as the history of previous errors caused in the second process.

12. A method comprising:

acquiring a history of combinations of process conditions for a first process of reading a document and a process result of a second process for an electronic document generated through the first process;

calculating a degree of success in the second process for each of the process conditions on a basis of the acquired history of combinations; and presenting, to a user, information for assisting the first process, the information including at least the degree of success for each of the process conditions.

13. A non-transitory computer readable medium storing a program causing a computer to execute a process comprising:

acquiring a history of combinations of process conditions for a first process of reading a document and a process result of a second process for an electronic document generated through the first process;

calculating a degree of success in the second process for each of the process conditions on a basis of the acquired history of combinations; and presenting, to a user, information for assisting the first process, the information including at least the degree of success for each of the process conditions.

* * * * *